US012614025B2

(12) United States Patent

Mukherjee

(10) Patent No.: US 12,614,025 B2

(45) Date of Patent: Apr. 28, 2026

(54) AUTHORSHIP SOURCE ANALYSIS FOR LARGE LANGUAGE MODELS (LLM) USING A DISTRIBUTED LEDGER

(71) Applicant: Bank of America Corporation, Charlotte, NC (US)

(72) Inventor: Maharaj Mukherjee, Poughkeepsie, NY (US)

(73) Assignee: Bank of America Corporation, Charlotte, NC (US)

( * ) Notice: Subject to any disclaimer, the term of this patent is extended or adjusted under 35 U.S.C. 154(b) by 176 days.

(21) Appl. No.: 18/376,906

(22) Filed: Oct. 5, 2023

(65) Prior Publication Data

US 2025/0117576 A1 Apr. 10, 2025

(51) Int. Cl.
*G06F 40/20* (2020.01)
*G06F 11/3668* (2025.01)

(52) U.S. Cl.
CPC .......... *G06F 40/20* (2020.01); *G06F 11/3688* (2013.01)

(58) Field of Classification Search
None
See application file for complete search history.

(56) References Cited

U.S. PATENT DOCUMENTS

| | | |
|---|---|---|
| 7,774,197 B1 | 8/2010 | Bulyko |
| 8,332,207 B2 | 12/2012 | Brants et al. |
| 8,812,291 B2 | 8/2014 | Brants et al. |
| 11,748,577 B1 | 9/2023 | Aberle |

| | | |
|---|---|---|
| 2008/0243481 A1 | 10/2008 | Brants et al. |
| 2010/0211378 A1 | 8/2010 | Bulyko |
| 2011/0137653 A1 | 6/2011 | Ljolje et al. |
| 2013/0346059 A1 | 12/2013 | Brants et al. |
| 2022/0036153 A1 | 2/2022 | O'Malia et al. |

(Continued)

FOREIGN PATENT DOCUMENTS

WO WO-2020172425 A1 * 8/2020 .......... G06F 11/1438

OTHER PUBLICATIONS

Poddar et al, Deploying a Retrieval based Response Model for Task Oriented Dialogues, Dec. 11 (Year: 2020).*

(Continued)

*Primary Examiner* — Paras D Shah
*Assistant Examiner* — Nicholas D Lowen
(74) *Attorney, Agent, or Firm* — Banner & Witcoff, Ltd.

(57) ABSTRACT

A computing platform may train an LLM by performing a plurality of clustering iterations. The computing platform may record, using a distributed ledger and for each of the plurality of clustering iterations, information of the corresponding clustering iteration. The computing platform may test the LLM, which may reveal at least one error in the LLM. The computing platform may identify, using the distributed ledger, a clustering iteration corresponding to the at least one error and information associated with the clustering iteration. The computing platform may identify, based on the clustering iteration corresponding to the at least one error and the information associated with the clustering iteration, a remediating action. The computing platform may update the LLM by performing the remediating action. The computing platform may retest the LLM. Based on identifying that an accuracy of the LLM meets or exceeds an accuracy threshold, the computing platform may deploy the LLM.

20 Claims, 8 Drawing Sheets

(56) References Cited

U.S. PATENT DOCUMENTS

| | | |
|---|---|---|
| 2022/0318270 A1 | 10/2022 | Safary et al. |
| 2022/0358030 A1 | 11/2022 | Yanamala et al. |
| 2022/0358031 A1 | 11/2022 | Yanamala et al. |
| 2022/0405061 A1 | 12/2022 | Jariwala |
| 2023/0074406 A1 | 3/2023 | Baeuml et al. |
| 2023/0135632 A1 | 5/2023 | Smolen et al. |
| 2023/0259705 A1 | 8/2023 | Tunstall-Pedoe et al. |
| 2023/0274086 A1 | 8/2023 | Tunstall-Pedoe et al. |
| 2023/0274089 A1 | 8/2023 | Tunstall-Pedoe et al. |
| 2023/0274094 A1 | 8/2023 | Tunstall-Pedoe et al. |
| 2024/0370662 A1* | 11/2024 | Khani et al. ............ G06F 40/30 |

OTHER PUBLICATIONS

KL Krithika "LLMs Ride the Overconfidence Wave: Is overfitting the cause of overconfident models?" Analytics India Magazine, https://analyticsindiamag.com/llms-ride-the-overconfidence-wave/, Sep. 8, 2023, pp. 1-14.

* cited by examiner

100

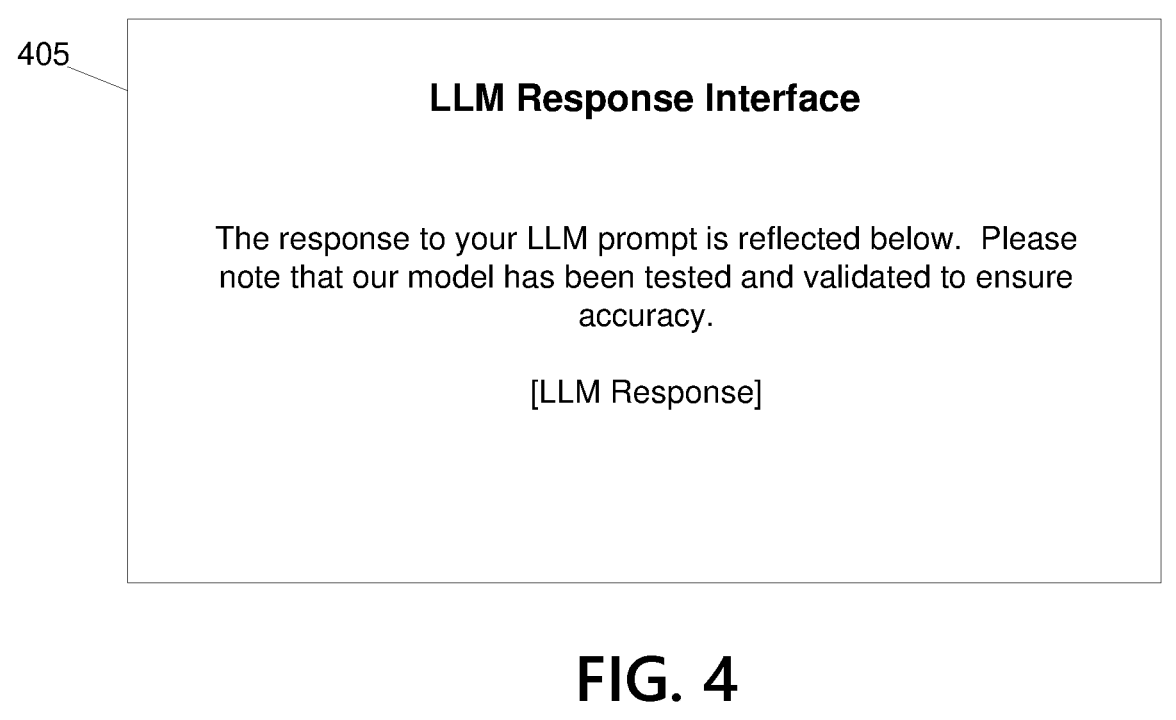

405

LLM Response Interface

The response to your LLM prompt is reflected below.  Please note that our model has been tested and validated to ensure accuracy.

[LLM Response]

FIG. 4

AUTHORSHIP SOURCE ANALYSIS FOR LARGE LANGUAGE MODELS (LLM) USING A DISTRIBUTED LEDGER

BACKGROUND

A large language model (LLM) is a computerized language model, embodied by an artificial neural network that may use a large amount of parameters in its layers with up to billions of weights between them. Many of such LLMs may be (pre-)trained on many graphics processing units (GPUs) in a relatively short time due to parallel processing of vast amounts of unlabeled text containing up to trillions of tokens (e.g., parts of words) provided by corpora, using self-supervised learning or semi-supervised learning, resulting in a tokenized vocabulary with a probability distribution. This process may be upgraded by using additional GPUs to (pre-)train the model with even more parameters on even greater amounts of unlabeled text Unfortunately, often times LLMs work as a black box generating answers that might be out right wrong, hazardous, insulting, or even dangerous. When that happens, it may be important to find out how such answers may have appeared, and identify the source or authorship of such a material from which the final answer may be derived.

SUMMARY

Aspects of the disclosure provide effective, efficient, scalable, and convenient technical solutions that address and overcome the technical problems associated with accuracy of large language models (LLM). In one or more instances, a computing platform having at least one processor, a communication interface, and memory may train a large language model (LLM) by performing a plurality of clustering iterations. The computing platform may record, using a distributed ledger and for each of the plurality of clustering iterations, information of the corresponding clustering iteration. The computing platform may test the LLM, which may reveal at least one error in the LLM. The computing platform may identify, using the distributed ledger, a clustering iteration corresponding to the at least one error and information associated with the clustering iteration. The computing platform may identify, based on the clustering iteration corresponding to the at least one error and the information associated with the clustering iteration, a remediating action. The computing platform may update the LLM by performing the remediating action. The computing platform may retest the LLM. Based on identifying that an accuracy of the LLM meets or exceeds an accuracy threshold, the computing platform may deploy the LLM for use in providing LLM responses to LLM prompts.

In one or more instances, recording the information of the corresponding clustering iteration may include recording information for each of the plurality of clusters in a corresponding block of the distributed ledger. In one or more instances, the at least one error may be at least one data point, of the LLM, that is incorrectly classified.

In one or more examples, the information associated with the clustering information may indicate data classification information for the clustering iteration corresponding to the at least one error. In one or more examples, the remediating action may be one or more of: modifying a weighting of the LLM, adding additional training data to the LLM, or modifying features of the LLM.

In one or more instances, retesting the LLM may include: 1) performing a subsequent clustering iteration, and 2)

recording the subsequent clustering iteration using the distributed ledger. In one or more instances, based on identifying that the accuracy of the LLM does not meet or exceed the accuracy threshold, the computing platform may: identify a further error in the LLM; identify, using the distributed ledger, a clustering iteration corresponding to the further error and information of the clustering iteration corresponding to the further error; identify, based on the clustering iteration corresponding to the further error and the information associated with the clustering iteration corresponding to the further error, a further remediating action; update the LLM by performing the further remediating action; and retest the LLM.

In one or more examples, the computing platform may receive, once the LLM is deployed for use, an LLM prompt. The computing platform may send, in response to receiving the LLM prompt, an LLM response, identified by the LLM.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 4 depicts an illustrative user interface for using a distributed ledger to perform authorship and source analysis of LLMs in accordance with one or more example embodiments.

DETAILED DESCRIPTION

Figure 1A:
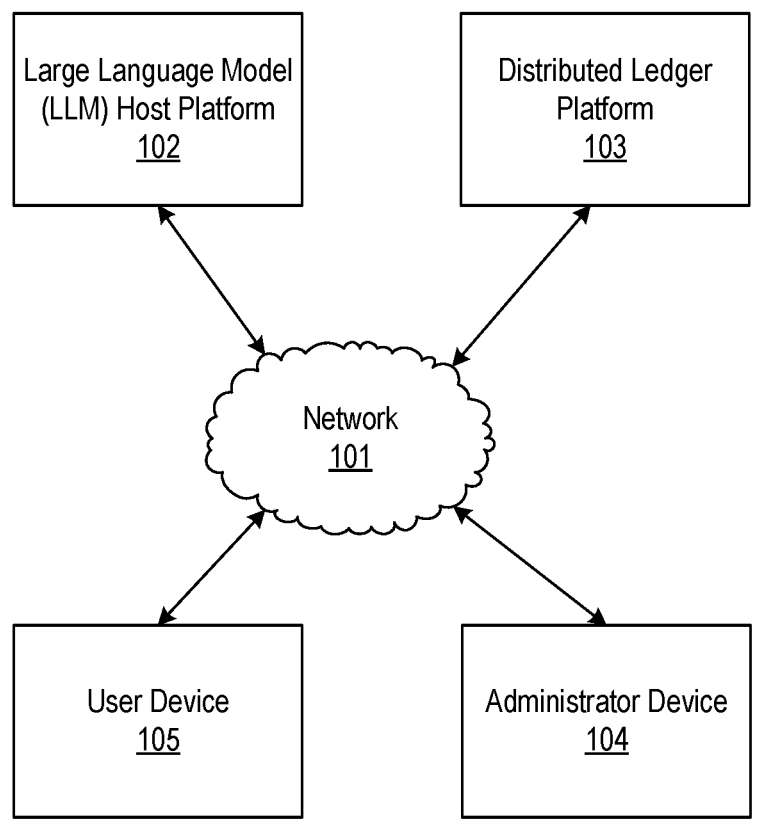
FIGS. 1A-1B depict an illustrative computing environment for using a distributed ledger to perform authorship and source analysis of LLMs in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction of the concepts described in further detail below, systems and methods for providing authorship and source analysis of LLMs are described herein. Recent advancements on chat bots using generative artificial intelligence (AI) have demonstrated the power of this new type of AI for multiple different applications. LLM is a special use case of generative AI.

The generative AI starts with building a generalized or foundational AI model with a massive amount of data covering almost anything, and letting it converge (after unsupervised learning) into an unspecified number of clusters. The foundational AI model is further specialized into several generative AI models built on top of it. For example, the generative AI models may be trained by using further unsupervised or semi-supervised models into create specialized clusters within the foundational AI model. For example, the foundational model may be adapted for various applications.

Although the different outcomes or tasks are generated from several data sources through the foundational AI, the basic nature of AI models may make it impossible to back track to the actual source of the data from the individual tasks.

A blockchain works on the principle of distributed ledger technology. With this shared ledger, all transactions are recorded only once, eliminating the duplication of effort that is otherwise typical of traditional business networks. As each transaction occurs, it is recorded as a "block" of data. Those transactions show the movement of an asset that can be tangible (a product) or intangible (intellectual). The data block can record the information of one's choice: who, what, when, where, how much and even the condition such as characteristics of a food shipment. Each block is connected to the ones before and after it. These blocks form a chain of data as an asset moves from place to place or ownership changes hands. The blocks confirm the exact time and sequence of transactions, and the blocks link securely together to prevent any block from being altered or a block being inserted between two existing blocks. Transactions are blocked together in an irreversible chain: a blockchain. Each additional block strengthens the verification of the previous block and hence the entire blockchain. This renders the blockchain tamper-evident, delivering the key strength of immutability. This removes the possibility of tampering by a malicious actor and builds a ledger of transactions you and other network members can trust. In other words, the blockchain can store all the information as it happened and in the order they happened and that information stays there forever.

Described herein is a solution for back tracking authorship and source for LLMs. A statistical machine learning algorithm may be divided into two broad categories supervised or unsupervised. In either case the machine learning (ML) algorithm may go through several iterative steps before final clusters are created or converged to. Such iterative clustering may be effective for points that may be interspaced in a very complex manner such as two interspaced spirals through deep learning. The deep learning may use a multiple layer neural network where the relative weights of the activation function for the neurons are iteratively adjusted.

Each iteration may be created as a transaction and stored as an immutable ledger in a blockchain. The blockchain may immutably store the history of each iteration along with all the related information such as the current status of points and which cluster they belong to as well as the relative weights for each of the activation functions, or the like. The blockchain may be used for backtracking to identify the original source. When any results call for explanation, the blockchain may be used for back tracking through the history of the iterations and the information may be used for pointing back to the original source for a particular task or final outcome.

Figure 1B:
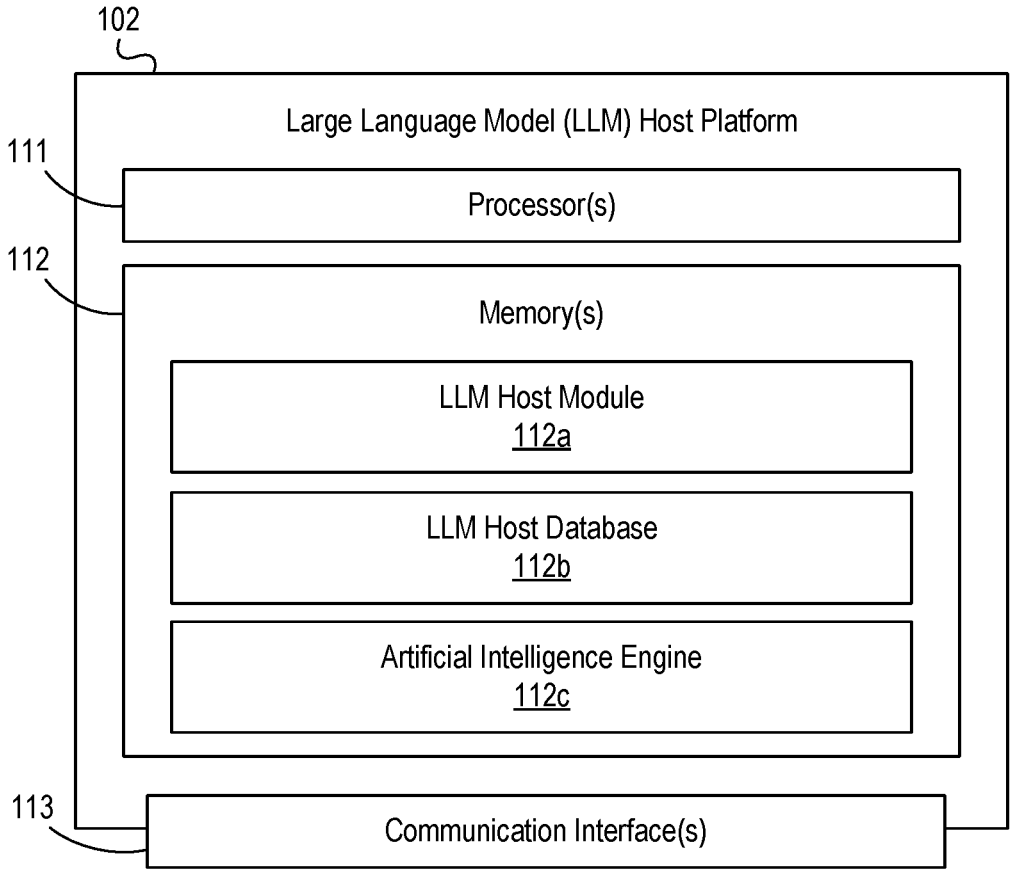

FIGS. 1A-1B depict an illustrative computing environment for using a distributed ledger to perform authorship and source analysis of LLMs in accordance with one or more example embodiments. Referring to FIG. 1A, computing environment 100 may include one or more computer systems. For example, computing environment 100 may include large language model (LLM) host platform 102, distributed ledger platform 103, administrator device 104, and user device 105.

As described further below, LLM host platform 102 may be a computer system that includes one or more computing devices (e.g., servers, server blades, or the like) and/or other computer components (e.g., processors, memories, communication interfaces) that may be used to train, host, and/or otherwise maintain a LLM configured to provide responses to received prompts. For example, the LLM host platform 102 may be configured to perform iterative clustering to train the LLM.

Distributed ledger platform 103 may be a computer system that includes one or more computing devices (e.g., servers, server blades, or the like) and/or other computer components (e.g., processors, memories, communication interfaces) that may be used to establish, host, and/or otherwise maintain a distributed ledger. In some instances, the distributed ledger platform 103 may be configured to record information of the training iterations for the LLM using the distributed ledger. Although the LLM host platform 102 and the distributed ledger platform 103 are depicted as separate systems, they may, in some instances, be incorporated into a single platform without departing from the scope of the disclosure.

Administrator device 104 may be and/or otherwise include a laptop computer, desktop computer, mobile device, tablet, smartphone, and/or other device that may be used by an individual (e.g., an administrator and/or other individual tasked with training and/or otherwise maintaining the LLM). In some instances, administrator device 104 may be configured to display one or more user interfaces (e.g., iterative training information interfaces, or the like).

User device 105 may be and/or otherwise include a laptop computer, desktop computer, mobile device, tablet, smartphone, and/or other device that may be used by an individual (e.g., to obtain responses from the LLM, or the like). In some instances, user device 105 may be configured to display one or more user interfaces (e.g., LLM response interfaces, or the like).

Although a single administrator device and user device are shown, any number of such devices may be deployed in the systems/methods described below without departing from the scope of the disclosure.

Computing environment 100 also may include one or more networks, which may interconnect LLM host platform 102, distributed ledger platform 103, administrator device 104, user device 105, or the like. For example, computing environment 100 may include a network 101 (which may interconnect, e.g., LLM host platform 102, distributed ledger platform 103, administrator device 104, user device 105, or the like).

In one or more arrangements, LLM host platform 102, distributed ledger platform 103, administrator device 104, and user device 105, may be any type of computing device capable of sending and/or receiving requests and processing the requests accordingly. For example, LLM host platform 102, distributed ledger platform 103, administrator device 104, user device 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of LLM host platform 102, distributed ledger platform 103, administrator device 104, and/or user device 105 may, in some instances, be special-purpose computing devices configured to perform specific functions.

Referring to FIG. 1B, LLM host platform 102 may include one or more processors 111, memory 112, and communication interface 113. A data bus may interconnect processor 111, memory 112, and communication interface 113. Communication interface 113 may be a network interface configured to support communication between LLM host platform 102 and one or more networks (e.g., network 101, or the like). Memory 112 may include one or more program modules having instructions that when executed by processor 111 cause LLM host platform 102 to perform one or more functions described herein and/or one or more databases that may store and/or otherwise maintain information which may be used by such program modules and/or processor 111. In some instances, the one or more program modules and/or databases may be stored by and/or maintained in different memory units of LLM host platform 102 and/or by different computing devices that may form and/or otherwise make up LLM host platform 102. For example, memory 112 may have, host, store, and/or include LLM host module 112a, LLM host database 112b, and/or artificial intelligence engine 112c.

LLM host module 112a may have instructions that direct and/or cause LLM host platform 102 to perform LLM authorship and source analysis, as discussed in greater detail below. LLM host database 112b may store information used by LLM host module 112a and/or LLM host platform 102 to perform LLM authorship and source analysis, and/or in performing other functions. Machine learning engine 112c may be configured to train, host, and/or otherwise maintain one or more machine learning models that may be used by LLM host module 112a and/or LLM host platform 102 to train, maintain, and/or otherwise refine the LLM.

Figure 2A:
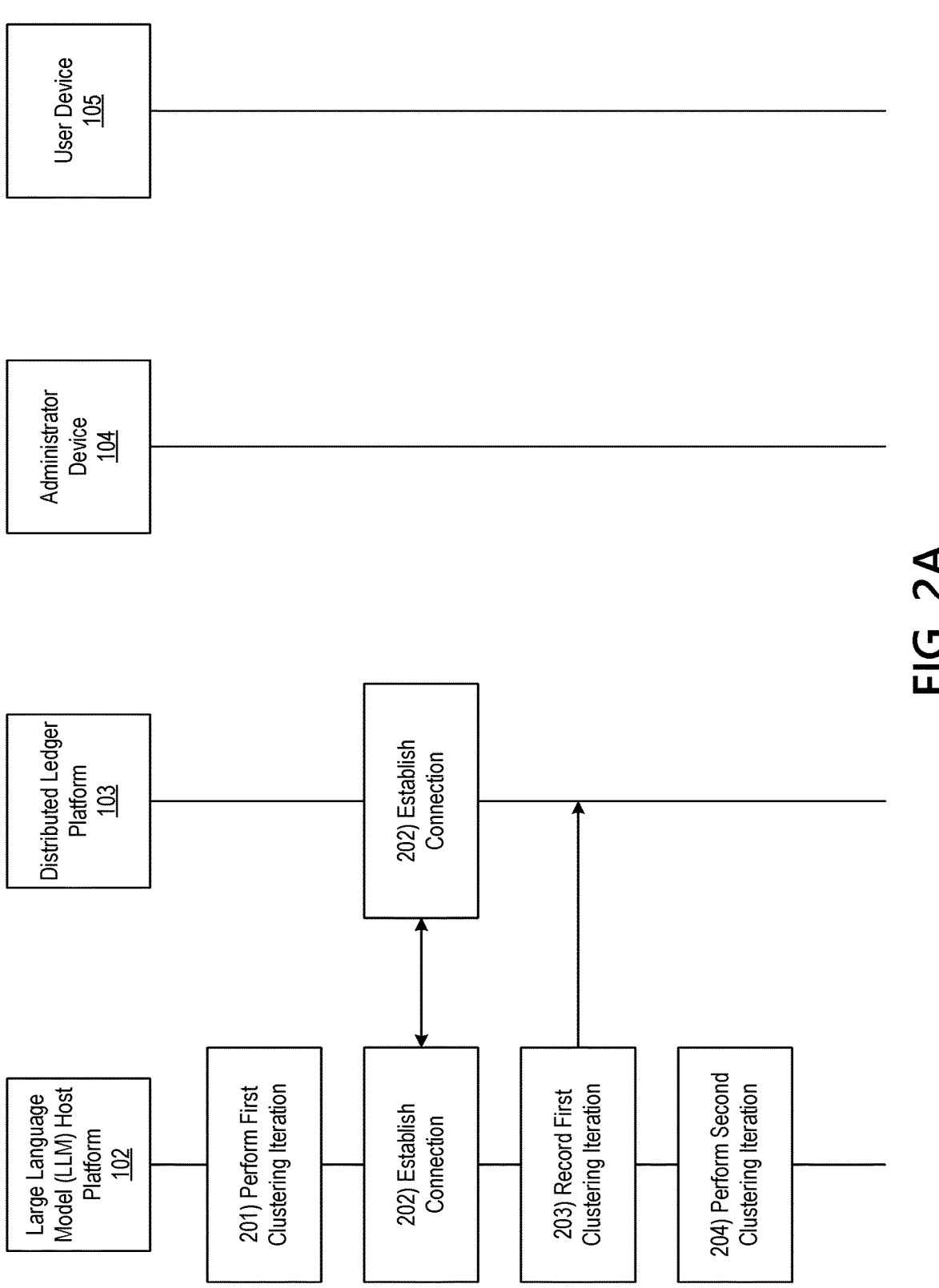
FIGS. 2A-2D depict an illustrative event sequence for using a distributed ledger to perform authorship and source analysis of LLMs in accordance with one or more example embodiments.

FIGS. 2A-2D depict an illustrative event sequence for using a distributed ledger to perform authorship and source analysis of LLMs in accordance with one or more example embodiments. Referring to FIG. 2A, at step 201, the LLM host platform 102 may initiate training of a LLM. For example, the LLM host platform 102 may train the LLM using iterative clustering, and may perform an initial clustering iteration. In doing so, the LLM host platform 102 may perform an initial clustering iteration for a plurality of datapoints used to train the LLM, which may, e.g., cluster each of the plurality of datapoints into one or more clusters accordingly. In performing the first clustering iteration, a first set of features may be used to perform the clustering, and a first set of weights may be used to do so.

At step 202, the LLM host platform 102 may establish a connection with the distributed ledger platform 103. For example, the LLM host platform 102 may establish a first wireless data connection with the distributed ledger platform 103 to link the LLM host platform 102 to the distribute ledger platform 103 (e.g., in preparation for recording clustering iteration information). In some instances, the LLM host platform 102 may identify whether or not a connection is already established with the distributed ledger platform 103. If a connection is already established with the distributed ledger platform 103, the LLM host platform 102 might not re-establish the connection. If a connection is not yet established with the distributed ledger platform 103, the LLM host platform 102 may establish the first wireless data connection as described herein.

At step 203, the LLM host platform 102 may record information of the first clustering iteration to the distributed ledger. For example, the LLM host platform 102 may communicate with the distributed ledger platform 103 (e.g., via the first wireless data connection) to record a hexadecimal representation of the first clustering iteration in a first entry of the distributed ledger. In these instances, the LLM host platform 102 may record a hexadecimal representation of the clusters to which the data was clustered, rationale behind the clustering, sources and/or authors of the data, weightings used in the clustering, features used in the clustering, and/or other information. In doing so, the LLM host platform 102 may configure the distributed ledger with references to the information of the first clustering iteration, which may, e.g., enable access of the information of the first clustering iteration by tracing the reference in the distributed ledger.

At step 204, the LLM host platform 102 may continue training of the LLM. For example, the LLM host platform 102 may train the LLM using iterative clustering, and may perform a second clustering iteration. In doing so, the LLM host platform 102 may perform an additional clustering iteration for the plurality of datapoints used to train the LLM, which may, e.g., cluster each of the plurality of datapoints into one or more clusters accordingly. In some instances, the datapoints may be clustered into the same or different clusters as those identified at step 201. In performing the second clustering iteration, the LLM host platform 102 may use the same or different features and/or weights as those used in the initial clustering iteration.

Figure 2B:
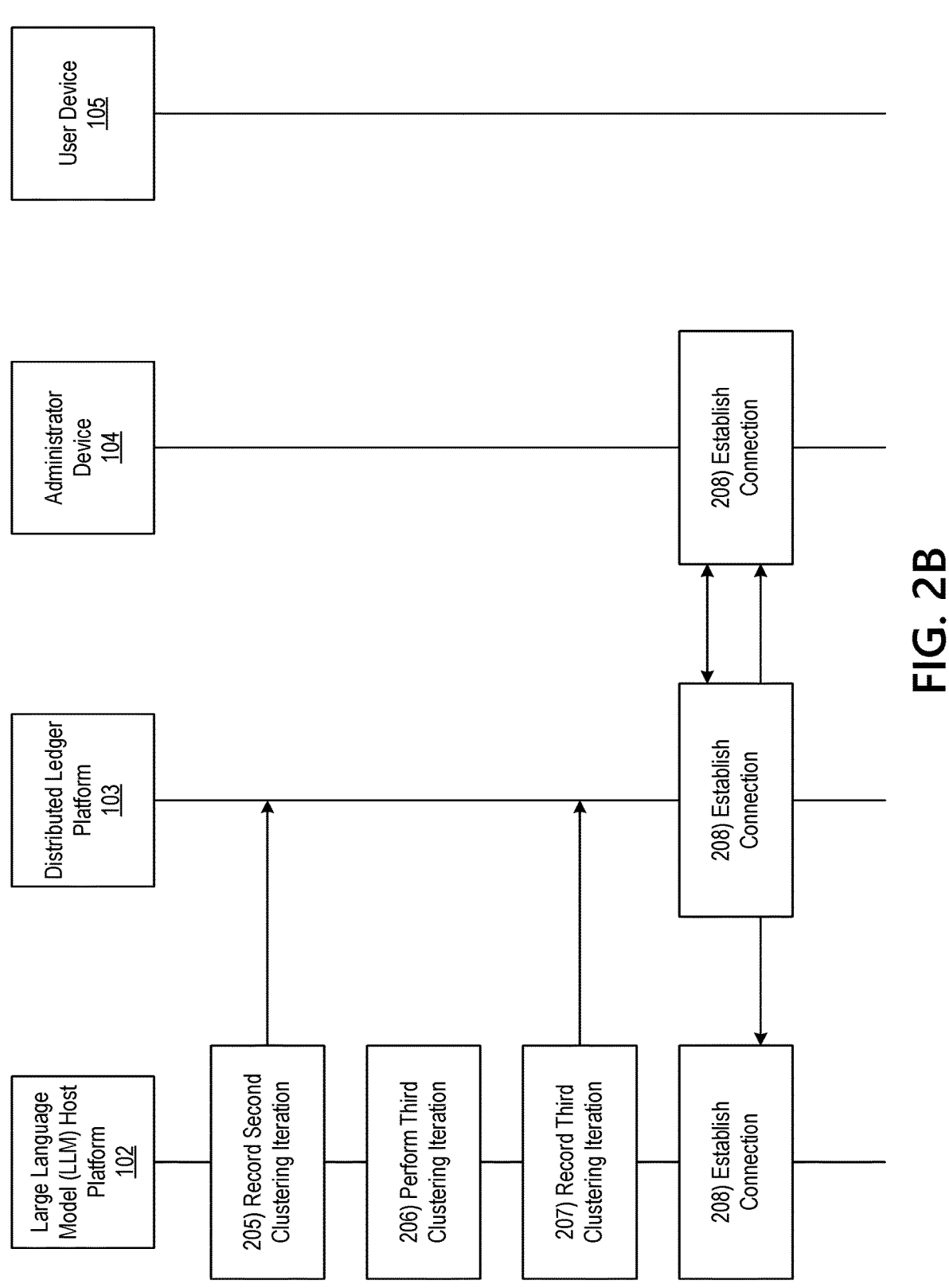

Referring to FIG. 2B, at step 205, the LLM host platform 102 may record information of the second clustering iteration to the distributed ledger. For example, the LLM host platform 102 may communicate with the distributed ledger platform 103 (e.g., via the first wireless data connection) to record a hexadecimal representation of the second clustering iteration in a second entry of the distributed ledger. In these instances, the LLM host platform 102 may record a hexadecimal representation of the clusters to which the data was clustered, rationale behind the clustering, sources and/or authors of the data, weightings used in the clustering, features used in the clustering, and/or other information. In doing so, the LLM host platform 102 may configure the distributed ledger with references to the information of the second clustering iteration, which may, e.g., enable access of the information of the second clustering iteration by tracing the reference in the distributed ledger.

At step 206, the LLM host platform 102 may continue training of the LLM. For example, the LLM host platform 102 may train the LLM using iterative clustering, and may perform a third clustering iteration. In doing so, the LLM host platform 102 may perform an additional clustering iteration for the plurality of datapoints used to train the LLM, which may, e.g., cluster each of the plurality of datapoints into one or more clusters accordingly. In some instances, the datapoints may be clustered into the same or different clusters as those identified at step 201 and/or step 204. In performing the third clustering iteration, the LLM host platform 102 may use the same or different features and/or weights as those used in the initial and/or second clustering iteration.

At step 207, the LLM host platform 102 may record information of the third clustering iteration to the distributed ledger. For example, the LLM host platform 102 may communicate with the distributed ledger platform 103 (e.g., via the first wireless data connection) to record a hexadecimal representation of the third clustering iteration in a third entry of the distributed ledger. In these instances, the LLM host platform 102 may record a hexadecimal representation of the clusters to which the data was clustered, rationale behind the clustering, sources and/or authors of the data, weightings used in the clustering, features used in clustering, and/or other information. In doing so, the LLM host platform 102 may configure the distributed ledger with references to the information of the third clustering iteration, which may, e.g., enable access of the information of the third clustering iteration by tracing the reference in the distributed ledger.

Although three clustering iterations are described, this is for illustrative purposes only and any number of such clustering iterations may be performed without departing from the scope of the disclosure. For example, the LLM host platform 102 may, in some instances, evaluate an accuracy of the LLM by comparing the classifications generated by the clustering iterations to true or otherwise actual classifications of the corresponding data. In these instances, a percentage of data points that are correctly clustered may be generated and compared to an accuracy threshold. If the accuracy threshold is met or exceeded, the LLM host platform 102 may proceed to step 208. In contrast, if the accuracy threshold is not met or exceeded, the LLM host platform 102 may return to step 206 to perform an additional clustering iteration.

At step 208, the administrator device 104 may establish connections with the LLM host platform 102 and/or distributed ledger platform 103. For example, the administrator device 104 may establish second and/or third wireless data connections with the LLM host platform 102 and/or the distributed ledger platform 103 to link the administrator device 104 to the LLM host platform 102 and/or distributed ledger platform 103 (e.g., in preparation for testing of the LLM). In some instances, the administrator device 104 may identify whether or not connections are already established with the LLM host platform 102 and/or the distributed ledger platform 103. If connections are already established with the LLM host platform 102 and/or the distributed ledger platform 103, the administrator device 104 might not re-establish the connections. If connections are not yet established with the LLM host platform 102 and/or the distributed ledger platform 103, the administrator device 104 may establish the second and/or third wireless data connections as described herein.

Figure 2C:
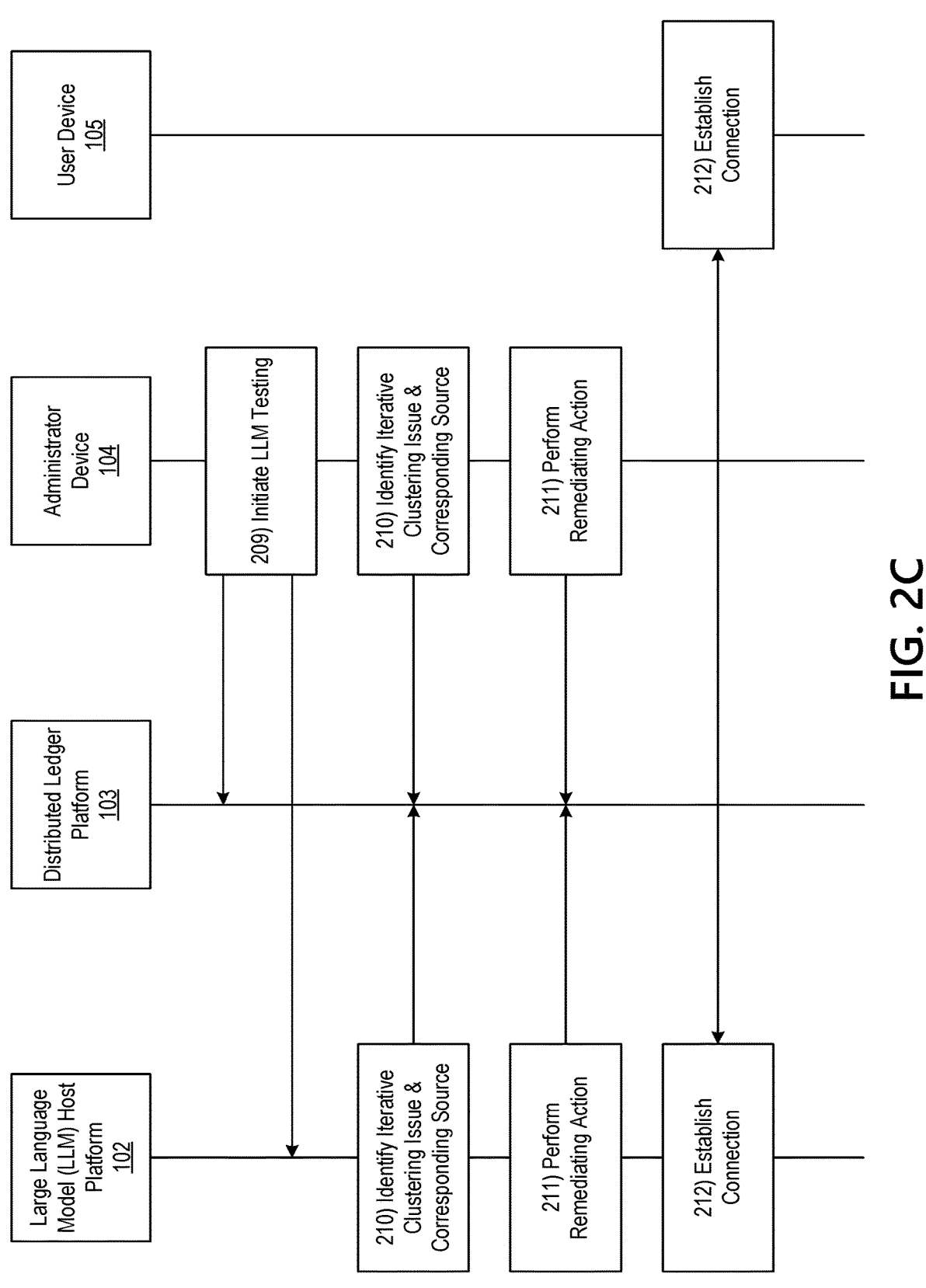

Referring to FIG. 2C, at step 209, the administrator device 104 may initiate testing of the LLM. For example, the administrator device 104 may send a request to the distributed ledger platform 103 (e.g., via the third wireless data connection) and/or the LLM host platform 102 (e.g., via the second wireless data connection) to initiate testing, and the testing may be initiated accordingly. In some instances, in addition or as an alternative to initiating the LLM testing based on a request from the administrator device 104, the LLM host platform 102 may automatically trigger the testing based on detecting toggling of a datapoint between multiple clusters, at a predetermined interval, detecting a change in clusters for a given data point, detecting drift in control data, and/or otherwise.

At step 210, the LLM host platform 102 and/or administrator device 104 may identify, based on the testing, a clustering issue at a particular clustering iteration (e.g., that a particular data point is clustered incorrectly). For example, the LLM host platform 102 and/or administrator device 104 may receive the clustering information to identify such clustering issues. The LLM host platform 102 and/or administrator device 104 may then access the distributed ledger (e.g., at the distributed ledger platform 103), to which the information of the iterative clustering is stored. For example, the LLM host platform 102 and/or administrator device 104 may trace the data associated with the clustering issue throughout the distributed ledger and back to an original author or source. In some instances, the LLM host platform 102 and/or administrator device 104 may identify, using the distributed ledger, which iteration the clustering issue is associated with. By maintaining information of the training data and/or the clustering iterations themselves in this way, the advantages of a distributed ledger (such as being immutable and distributed, or the like), may be realized.

At step 211, the LLM host platform 102 and/or administrator device 104 may perform a remediating action based on the identified clustering issue and/or the corresponding source/authorship information. For example, the LLM host platform 102 and/or administrator device 104 may remove data associated with the identified author/source from the training data set for the LLM. Additionally or alternatively, the LLM host platform 102 may add additional training data to the LLM. Additionally or alternatively, the LLM host platform 102 and/or administrator device 104 may adjust the weighting of features and/or the features themselves. Once the remediating action is performed, the LLM host platform 102 may return to step 206 to perform one or more additional clustering iterations, and retest the LLM once the one or more additional clustering iterations have been performed. In these instances, information of these additional clustering iterations may be recorded at the distributed ledger (e.g., as is described above with regard to the first, second, and third clustering iterations).

In some instances, once the remediating action is performed, the LLM host platform 102 may re-evaluate the accuracy of the LLM by comparing the classifications generated by the clustering iterations to true or otherwise actual classifications of the corresponding data. In these instances, a percentage of data points that are correctly clustered may be generated and compared to the accuracy threshold. If the accuracy threshold is met or exceeded, the LLM host platform 102 may proceed to step 212. In contrast, if the accuracy threshold is not met or exceeded, the LLM host platform 102 may return to step 209 to perform additional LLM testing, analysis, and/or remediation.

At step 212, the user device 105 may establish a connection with the LLM host platform 102. For example, the user device 105 may establish a fourth wireless data connection with the LLM host platform 102 to link the user device 105 to the LLM host platform 102 (e.g., in preparation for sending LLM prompts). In some instances, the user device 105 may identify whether or not a connection is already established with the LLM host platform 102. If a connection is already established with the LLM host platform 102, the user device 105 might not re-establish the connection. Otherwise, if a connection is not yet established with the LLM host platform 102, the user device 105 may establish the fourth wireless data connection as described herein.

Figure 2D:
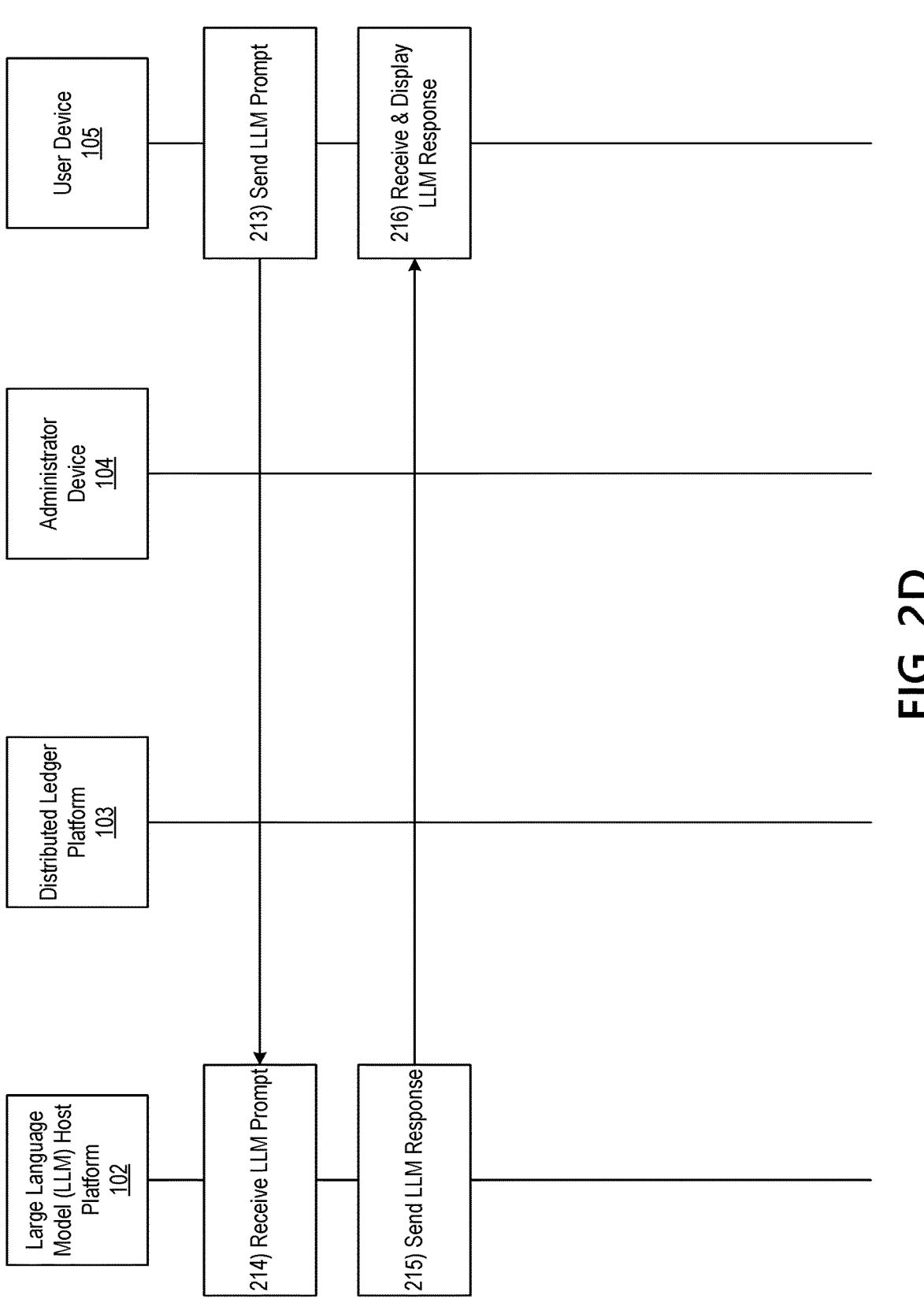

Referring to FIG. 2D, at step 213, the user device 105 may send an LLM prompt to the LLM host platform 102. For example, the user device 105 may send the LLM prompt to the LLM host platform 102 while the fourth wireless data connection is established.

At step 214, the LLM host platform 102 may receive the LLM prompt from the user device 105. For example, the LLM host platform 102 may receive the LLM prompt from the user device 105 via the communication interface 113 and while the fourth wireless data connection is established.

At step 215, the LLM host platform 102 may input the LLM prompt into the LLM to generate an LLM response. Based on the testing and refinement of the LLM, the LLM response may be more accurate than if such testing and refinement had not been performed. The LLM host platform 102 may then send the LLM response to the user device 105. For example, the LLM host platform 102 may send the LLM response to the user device 105 via the communication interface 113 and while the fourth wireless data connection is established. In some instances, the LLM host platform 102 may also send one or more commands directing the user device 105 to display the LLM response.

At step 216, the user device 105 may receive the LLM response sent at step 215. For example, the user device 105 may receive the LLM response while the fourth wireless data connection is established. In some instances, the user device 105 may also receive the one or more commands directing the user device 105 to display the LLM response. Based on or in response to the one or more commands directing the user device 105 to display the LLM response, the user device 105 may display the LLM response. For example, the user device 105 may display a graphical user interface similar to graphical user interface 405, which is illustrated in FIG. 4.

By refining LLMs in this way and using a distributed ledger to manage authorship and/or source analysis for iterative clustering, the advantages of LLMs may be realized, without sacrificing on accuracy of the responses. Furthermore, authors and/or other data sources may be linked to the data itself through the use of the distributed ledger, which may, e.g., enable the identification of authors and/or other data sources, and removal of the corresponding data accordingly.

Figure 3:
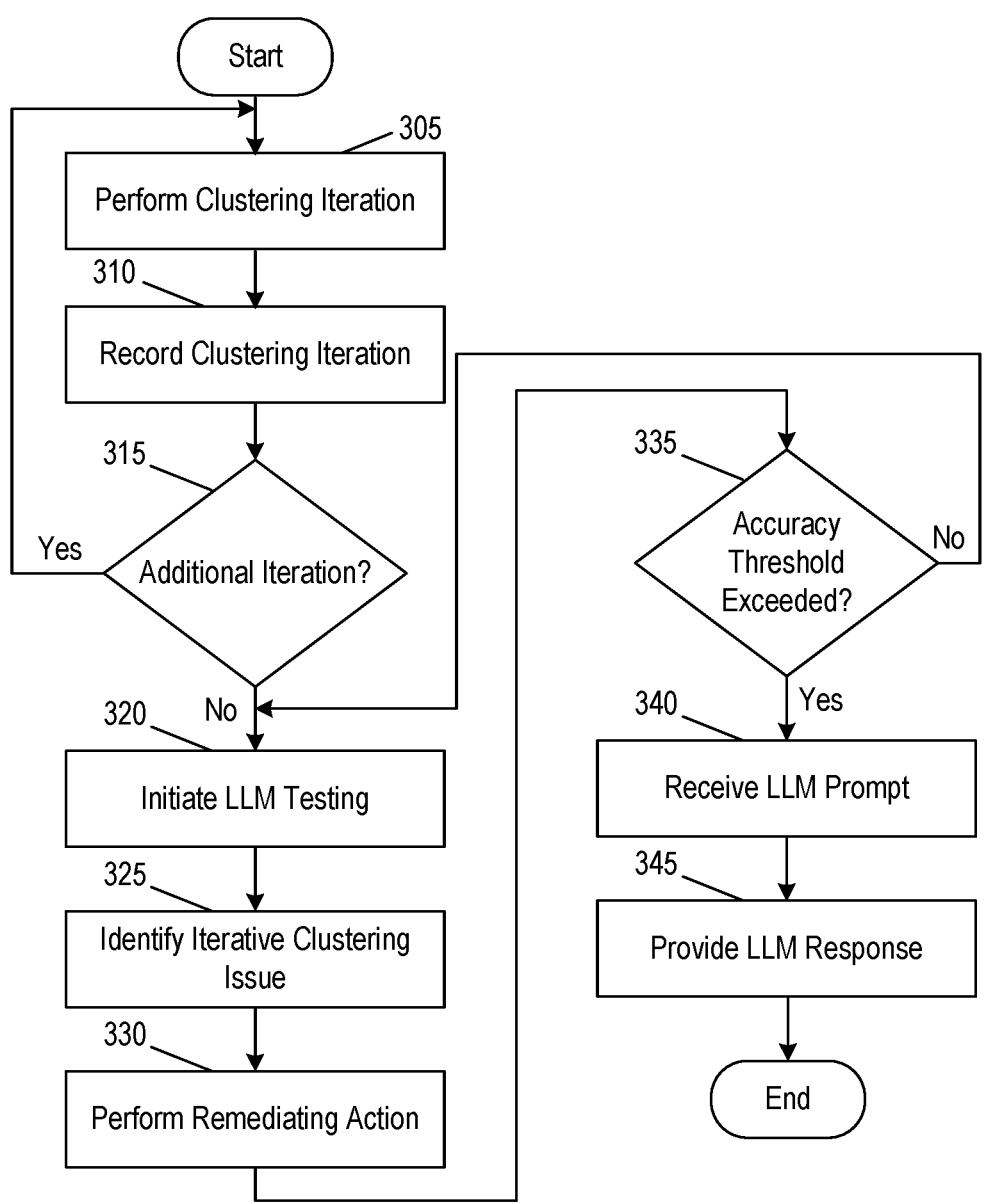
FIG. 3 depicts an illustrative method for using a distributed ledger to perform authorship and source analysis of LLMs in accordance with one or more example embodiments.

FIG. 3 depicts an illustrative method for using a distributed ledger to perform authorship and source analysis of LLMs in accordance with one or more example embodiments. At step 305, a computing platform having at least one processor, a communication interface, and memory may perform a clustering iteration to train a LLM. At step 310, the computing platform may record information of the clustering iteration in a distributed ledger. At step 315, the computing platform may identify whether or not an additional clustering iteration should be performed. If an additional clustering iteration should be performed, the computing platform may return to step 305. If an additional iteration should not be performed, the computing platform may proceed to step 320.

At step 320, the computing platform may initiate LLM testing. At step 325, the computing platform may identify an iterative clustering issue. At step 330, the computing platform may perform a remediating action for the iterative clustering issue. At step 335, the computing platform may identify whether or not accuracy of the LLM meets or exceeds an accuracy threshold. If the computing platform identifies that the accuracy threshold is not met or exceeded, the computing platform may return to step 320 to perform additional testing. If the computing platform identifies that the accuracy threshold is met or exceeded, the computing platform may proceed to step 340.

At step 340, the computing platform may receive an LLM prompt from a user device. At step 345, the computing platform may provide an LLM response to the user device in response to the LLM prompt.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:
1. A computing platform comprising:
at least one processor;

a communication interface communicatively coupled to the at least one processor; and memory storing computer-readable instructions that, when executed by the at least one processor, cause the computing platform to:

train a large language model (LLM) by performing a plurality of clustering iterations, wherein performing the plurality of clustering iterations includes performing at least a first clustering iteration and a second clustering iteration, and wherein performing the training comprises using deep learning to cluster multiple interspaced data spirals, and wherein the deep learning comprises using a multiple layer neural network where relative weights of an activation function for corresponding neurons are iteratively adjusted to cluster the multiple interspaced data spirals;

record, using a distributed ledger and for each of the plurality of clustering iterations, information of a corresponding clustering iteration;

test the trained LLM, wherein testing the trained LLM reveals at least one error in the LLM;

identify, using the distributed ledger, that the first clustering iteration corresponds to the at least one error and information associated with the first clustering iteration, wherein the identifying comprises identifying that the at least one error occurred during the first clustering iteration rather than the second clustering iteration;

identify, based on the first clustering iteration corresponding to the at least one error and the information associated with the first clustering iteration, a remediating action;

update the trained LLM by performing the remediating action;

retest the updated LLM; and based on identifying that an accuracy of the updated LLM meets or exceeds an accuracy threshold, deploy the updated LLM;

receive, at the deployed LLM, a LLM prompt; and generate, in response to receiving the LLM prompt and using the deployed LLM, a LLM response.

2. The computing platform of claim 1, wherein recording the information of the corresponding clustering iteration comprises recording information for each of the plurality of clusters in a corresponding block of the distributed ledger.

3. The computing platform of claim 1, wherein the at least one error comprises at least one data point, of the LLM, that is incorrectly classified.

4. The computing platform of claim 1, wherein the information associated with the first clustering iteration indicates data classification information for the first clustering iteration corresponding to the at least one error.

5. The computing platform of claim 1, wherein the remediating action comprises modifying a weighting of the LLM, adding additional training data to the LLM, and modifying features of the LLM.

6. The computing platform of claim 1, wherein retesting the LLM comprises:

performing a subsequent clustering iteration; and recording the subsequent clustering iteration using the distributed ledger.

7. The computing platform of claim 1, wherein the memory stores additional computer-readable instructions that, when executed by the at least one processor, further cause the computing platform to:

based on identifying that the accuracy of the LLM does not meet or exceed the accuracy threshold:

identify a further error in the LLM;

identify, using the distributed ledger, a clustering iteration corresponding to the further error and information of the clustering iteration corresponding to the further error;

identify, based on the clustering iteration corresponding to the further error and the information associated with the clustering iteration corresponding to the further error, a further remediating action;

update the LLM by performing the further remediating action; and retest the LLM.

8. The computing platform of claim 1, wherein the memory stores additional computer-readable instructions that, when executed by the at least one processor, further cause the computing platform to:

receive, once the LLM is deployed for use, an LLM prompt; and send, in response to receiving the LLM prompt, an LLM response, identified by the LLM.

9. The computing platform of claim 1, wherein testing of the trained LLM is automatically triggered based on detecting toggling of a datapoint between multiple clusters, a change in clusters for a given data point, and a drift in control data.

10. A method comprising:

at a computing platform comprising at least one processor, a communication interface, and memory:

training a large language model (LLM) by performing a plurality of clustering iterations, wherein performing the plurality of clustering iterations includes performing at least a first clustering iteration and a second clustering iteration, and wherein performing the training comprises using deep learning to cluster multiple interspaced data spirals, and wherein the deep learning comprises using a multiple layer neural network where relative weights of an activation function for corresponding neurons are iteratively adjusted to cluster the multiple interspaced data spirals;

recording, using a distributed ledger and for each of the plurality of clustering iterations, information of the corresponding clustering iteration;

testing the trained LLM, wherein testing the trained LLM reveals at least one error in the LLM;

identifying, using the distributed ledger, that the first clustering iteration corresponds to the at least one error and information associated with the first clustering iteration, wherein the identifying comprises identifying that the at least one error occurred during the first clustering iteration rather than the second clustering iteration;

identifying, based on the first clustering iteration corresponding to the at least one error and the information associated with the first clustering iteration, a remediating action;

updating the trained LLM by performing the remediating action;

retesting the updated LLM; and based on identifying that an accuracy of the updated LLM meets or exceeds an accuracy threshold, deploying the updated LLM;

receiving, at the deployed LLM, a LLM prompt; and generating, in response to receiving the LLM prompt and using the deployed LLM, a LLM response.

11. The method of claim 10, wherein recording the information of the corresponding clustering iteration comprises recording information for each of the plurality of clusters in a corresponding block of the distributed ledger.

12. The method of claim 10, wherein the at least one error comprises at least one data point, of the LLM, that is incorrectly classified.

13. The method of claim 10, wherein the information associated with the first clustering iteration indicates data classification information for the first clustering iteration corresponding to the at least one error.

14. The method of claim 10, wherein the remediating action comprises modifying a weighting of the LLM, adding additional training data to the LLM, and modifying features of the LLM.

15. The method of claim 10, wherein retesting the LLM comprises:

performing a subsequent clustering iteration; and recording the subsequent clustering iteration using the distributed ledger.

16. The method of claim 10, further comprising:

based on identifying that the accuracy of the LLM does not meet or exceed the accuracy threshold:

identifying a further error in the LLM;

identifying, using the distributed ledger, a clustering iteration corresponding to the further error and information of the clustering iteration corresponding to the further error;

identifying, based on the clustering iteration corresponding to the further error and the information associated with the clustering iteration corresponding to the further error, a further remediating action;

updating the LLM by performing the further remediating action; and retesting the LLM.

17. The method of claim 10, further comprising:

receiving, once the LLM is deployed for use, an LLM prompt; and sending, in response to receiving the LLM prompt, an LLM response, identified by the LLM.

18. One or more non-transitory computer-readable media storing instructions that, when executed by a computing platform comprising at least one processor, a communication interface, and memory, cause the computing platform to:

train a large language model (LLM) by performing a plurality of clustering iterations, wherein performing the plurality of clustering iterations includes performing at least a first clustering iteration and a second clustering iteration, and wherein performing the training comprises using deep learning to cluster multiple interspaced data spirals, and wherein the deep learning comprises using a multiple layer neural network where relative weights of an activation function for corresponding neurons are iteratively adjusted to cluster the multiple interspaced data spirals;

record, using a distributed ledger and for each of the plurality of clustering iterations, information of the corresponding clustering iteration;

test the trained LLM, wherein testing the trained LLM reveals at least one error in the LLM;

identify, using the distributed ledger, that the first clustering iteration corresponds to the at least one error and information associated with the first clustering iteration, wherein the identifying comprises identifying that the at least one error occurred during the first clustering iteration rather than the second clustering iteration;

identify, based on the first clustering iteration corresponding to the at least one error and the information associated with the first clustering iteration, a remediating action;

update the trained LLM by performing the remediating action;

retest the updated LLM; and based on identifying that an accuracy of the updated LLM meets or exceeds an accuracy threshold, deploy the updated LLM;

receive, at the deployed LLM, a LLM prompt; and generate, in response to receiving the LLM prompt and using the deployed LLM, a LLM response.

19. The one or more non-transitory computer-readable media of claim 18, wherein recording the information of the corresponding clustering iteration comprises recording information for each of the plurality of clusters in a corresponding block of the distributed ledger.

20. The one or more non-transitory computer-readable media of claim 18, wherein the at least one error comprises at least one data point, of the LLM, that is incorrectly classified.

* * * * *